Figure 1:
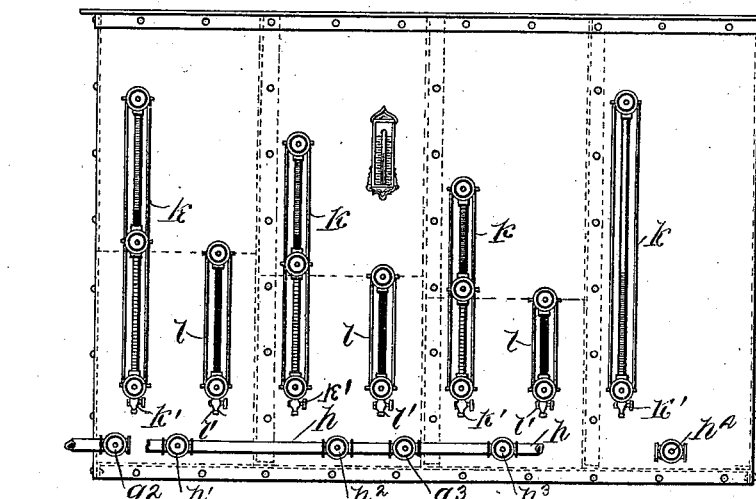

(No Model.)

W. B. TURNER.
CLARIFIER FOR LIQUIDS.

No. 556,593. Patented Mar. 17, 1896.

Witnesses:
De Witt C. Tanner
W. Clyde Jones

Inventor,
William B. Turner
By Barton & Brown
Attorneys.

UNITED STATES PATENT OFFICE.

WILLIAM B. TURNER, OF CHICAGO, ILLINOIS, ASSIGNOR TO SAMUEL INSULL, OF SAME PLACE.

CLARIFIER FOR LIQUIDS.

SPECIFICATION forming part of Letters Patent No. 556,593, dated March 17, 1896.

Application filed September 19, 1895. Serial No. 562,940. (No model.)

*To all whom it may concern:*

Be it known that I, WILLIAM B. TURNER, a citizen of the United States, residing at Chicago, in the county of Cook and State of Illinois, have invented a certain new and useful Improvement in Clarifiers for Liquids, (Case No. 2,) of which the following is a full, clear, concise, and exact description, reference being had to the accompanying drawings, forming a part of this specification.

My invention relates to a filter or clarifier for oils and other liquids, my invention being particularly applicable to the filtration of oils to remove dirt and other impurities therefrom.

In accordance with my invention a vessel is provided which is filled to a certain height with water or other filtering liquid heavier than the liquid to be filtered. Immersed in the liquid is a body or layer of filtering material, preferably closely-packed excelsior, the upper edge of the layer of filtering material being preferably situated at the level of the water within the vessel. The oil-supply pipe opens into the vessel a short distance above the bottom thereof and below the lower edge of the body of filtering material. Above the lower body or layer of filtering material is an upper layer of filtering material, a space being left between the two layers in which is provided the dirt-receptacle. The dirt-receptacle is preferably formed by means of a hood having a centrally-located upwardly-extending portion, closed at the top, but provided in the sides near the top with openings for the passage of the oil. The space around the upwardly-extending central portion is closed at the bottom to form a dirt-receptacle, and a duct is provided, communicating with the dirt-receptacle, through which the dirt may be withdrawn. A gage is provided for indicating the height of the column of liquid in the dirt-receptacle. The oil passes downward through the supply-pipe, issuing from the end thereof and rising through the water coming in contact with the lower edge of the first body of filtering material, a considerable portion of the heavier particles of dirt and impurities being thereby removed from the oil and falling to the bottom of the vessel. The oil then passes upward through the first body of filtering material to the surface of the water, where it accumulates within the hood. When the level of the oil rises to the lateral openings in the hood, the oil passes to the exterior of the hood—that is, into the dirt-receptacle—where it remains until the level of the oil has risen sufficiently to bring the oil into contact with the lower edge of the second body of filtering material, in coming in contact with which a considerable portion of the dirt suspended in the oil is removed and settles to the bottom of the dirt-receptacle. As the quantity of oil supplied to the filter increases, the level of the oil rises and the oil is passed through the second body of filtering material. A pipe extends from the first vessel above the top of the upper body of filtering material to a second vessel, similarly arranged, and from this vessel the oil is passed to a third, and so on as often as may be required to filter the oil to any required degree. The last vessel contains a receptacle filled with filtering material and open at the bottom. The oil passes downward through the filtering material and into the vessel in which the receptacle is placed. The oil may be withdrawn from the last vessel as desired for use.

Figure 2:
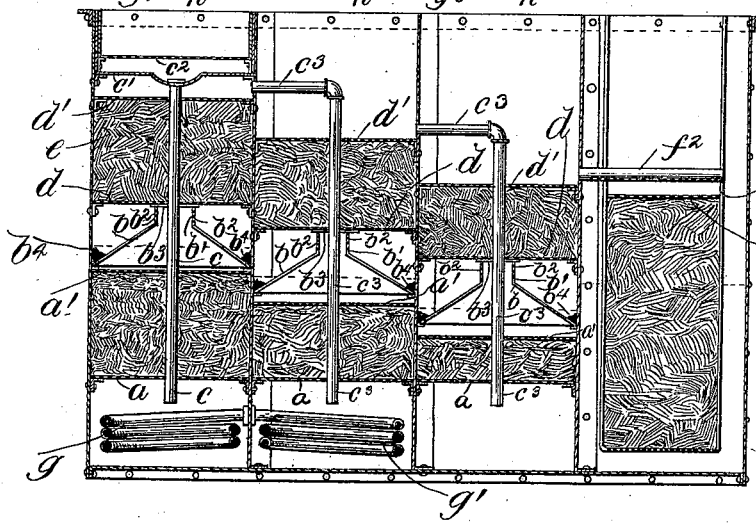
Figure 3:
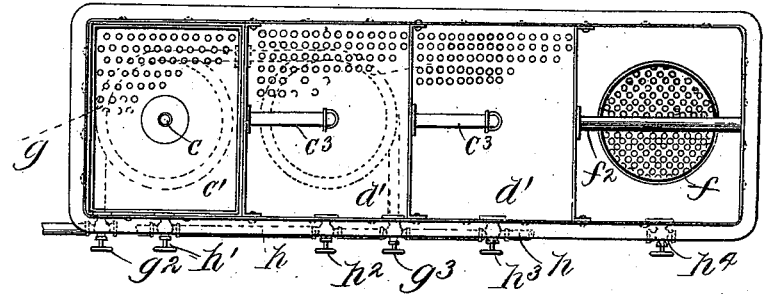

Referring to the accompanying drawings, Figure 1 is a view in elevation of a filter embodying my invention. Fig. 2 is a vertical sectional view thereof. Fig. 3 is top view of the filter.

Like letters refer to like parts in the several figures.

Referring to the first vessel upon the left, which is the vessel through which the oil is first passed, a perforated plate $a$ is situated at a distance from the bottom of the vessel and a quantity of fine shavings or excelsior is packed upon the top of the plate and held down by a second perforated plate $a'$, which rests upon its surface. Above the plate $a'$ is provided a conical hood $b$, provided at the upper end with a cylindrical portion $b'$, having perforations $b^2$ $b^2$ in the walls thereof. A washer $b^3$ is fitted upon the top of the cylindrical portion $b'$ and closely grasps the pipe $c$, extending through the center of the vessel. At the juncture of the hood $b$ with the walls of the vessel a layer $b^4$ of oakum or other packing material is provided to afford a close joint and prevent the downward passage of the impurities removed from the oil. Above the washer $b^3$ is provided a perforated plate $d$, between which and the perforated plate $d'$ is provided a quantity of filtering material $e$, which may be closely-packed excelsior. In the top of the vessel is provided a pan $c'$, communicating with the pipe $c$, which extends to a short distance above the bottom of the vessel. A perforated plate $c^2$ is provided in the pan $c'$ to prevent foreign matter from passing into the pipe $c$.

A short distance above the plate $d'$ a pipe $c^3$ extends to the second vessel, the filtering apparatus of the second vessel being the same as that of the first except that the plates $a'$, $d$, and $d'$ and the hood $b$ are several inches lower than in the first vessel.

At the side of the second vessel is provided a third vessel, the filtering apparatus being the same as that in the first two vessels except that the plates $a'$, $d$, and $d'$ and the hood $b$ are several inches lower than in the second vessel, while the pipe $c^3$ opens from the second vessel into the third some distance below the point at which the first vessel opens into the second.

In the fourth vessel or chamber is provided a cylindrical receptacle $f$, provided with a perforated bottom resting a short distance above the bottom of the vessel, the receptacle $f$ being filled with filtering material, upon the top of which is placed a perforated plate $f'$. A pipe $f^2$ extends from the third vessel and passes through the walls of the receptacle $f$, being provided with perforations whereby the oil may pass from the third to the fourth vessel.

In the bottom of the first and of the second receptacle coils of steam-pipe $g$ $g'$ are provided, the coils being connected at one end with a valve $g^2$ and at the other end with a valve $g^3$, the steam entering through the valve $g^2$, passing through the coils $g$ $g'$ and finding exit through the valve $g^3$, which is connected with the pipe $h$ extending to the sewer or other place of exhaust. Valves $h'$ $h^2$ $h^3$ are provided in the lower ends of the first three vessels respectively, whereby the water may be admitted or drawn off, while the valve $h^4$ is provided in the lower end of the fourth vessel for drawing off the filtered oil. The end of the pipe $h$ to the left may be connected with the water-mains and water thus admitted to any one of the vessels at will.

Gages $k$ $k$ are provided upon the fronts of the several vessels, the gages being connected with the vessels at the upper and the lower ends and at the middle, the gage opening into the vessel at the upper end at a point just beneath the mouth of the pipe $c^3$ and at the middle just above the water-line. Cocks $k'$ $k'$ are provided at the lower ends of the gages for withdrawing the water or oil within the gages. Upon the fronts of the vessels are also provided gages $l$ $l$, which open into the filtering-vessels at the water-line—that is, just above the point where the conical wall of the hood $b$ joins the sides of the vessels. Cocks $l'$ $l'$ are provided at the lower ends of the tubes of the gages, whereby the dirt and filtered matter resting between the surface of the water and the pure oil above may be drawn off.

Having described my invention, what I claim as new, and desire to secure by Letters Patent, is—

1. In a filter, the combination with a retaining-vessel, of a body of filtering material in the lower end thereof, immersed in a body of liquid heavier than the liquid to be filtered and filling the vessel to a level near the top of said body of filtering material; a supply-pipe opening into the retaining-vessel a short distance from the bottom thereof and below said body of filtering material, a second body of filtering material situated in the upper end of the retaining-vessel, a space being left between the bodies of filtering material, a hood situated in said space and provided with a centrally-located, upwardly-extending portion, closed at the top and communicating upon the interior with the lower end of the retaining-vessel, lateral openings being provided in said hood near the upper end of said upwardly-extending portion; a dirt-receptacle provided upon the exterior of said hood, closed at the bottom and communicating at the top with the upper body of filtering material, the lateral openings in the hood affording communication between the interior of the hood and said dirt-receptacle; a duct communicating with said dirt-receptacle for withdrawing the impurities removed from the liquid being filtered, and a duct extending from said retaining-vessel, and situated above the upper body of filtering material; substantially as described.

2. In a filter, the combination with a retaining-vessel, of a body of filtering material situated in the lower end thereof and immersed in a body of liquid heavier than the liquid to be filtered, an oil-supply pipe or duct opening into the retaining-vessel beneath said body of filtering material; a second body of filtering material situated above the said first-mentioned body of filtering material, a space being left between the two bodies of filtering material, a partition dividing said space into two parts, one communicating with the lower body of filtering material and closed at the top but provided near the top with openings communicating with the space on the other side of the partition, which space is sealed at the bottom to form a dirt-receptacle and communicates with the upper body of filtering material; a duct communicating with the dirt-receptacle for withdrawing the impurities removed from the liquid being filtered, and a duct extending from the retaining-vessel and situated above the second body of filtering material.

3. The combination with a filtering-vessel of the perforated plate $a$ supporting the filtering material, the hood $b$, the plate $d$ situated above said hood and supporting the filtering material, the pan $c'$, the pipe $c$ communicating therewith and extending to a position near the bottom of the vessel, and the duct for drawing off the impurities of the oil; substantially as described.

4. The combination with a number of filtering-vessels arranged in series, each of said vessels containing filtering material and being filled to a definite level with a liquid heavier than the liquid to be filtered, a duct situated near the level of the liquid for drawing off the impurities in the oil and means for passing the oil upward through the liquid and the filtering material without causing the oil to pass through the column of impurities; of a vessel containing a receptacle filled with filtering material and having a perforated bottom, said receptacle being in communication with the last of the series of filtering-vessels; substantially as described.

In witness whereof I hereunto subscribe my name this 11th day of September, A. D. 1895.

WILLIAM B. TURNER.

Witnesses:
JOHN W. SINCLAIR,
W. CLYDE JONES.